(12) United States Patent
Venema et al.

(10) Patent No.: US 8,702,857 B2
(45) Date of Patent: Apr. 22, 2014

(54) METHOD FOR REJUVENATING A BITUMEN CONTAINING COMPOSITION

(75) Inventors: Jeroen Berend Venema, Amsterdam (NL); Antonius Caspar Johannes Eijkenboom, Herrhugowaard (NL); Koen Dimitri van Weezenbeek, Herrhugowaard (NL); Sebastiaan Joannes van Weezenbeek, Alkmaar (NL)

(73) Assignee: Van Weezenbeek Specialties B.V., Heerhugowaard (NL)

( * ) Notice: Subject to any disclaimer, the term of this patent is extended or adjusted under 35 U.S.C. 154(b) by 298 days.

(21) Appl. No.: 13/144,370

(22) PCT Filed: Jan. 21, 2010

(86) PCT No.: PCT/NL2010/000007
§ 371 (c)(1),
(2), (4) Date: Sep. 16, 2011

(87) PCT Pub. No.: WO2010/085140
PCT Pub. Date: Jul. 29, 2010

(65) Prior Publication Data
US 2012/0017804 A1    Jan. 26, 2012

(30) Foreign Application Priority Data
Jan. 22, 2009  (NL) .................................... 2002442

(51) Int. Cl.
*C08L 95/00* (2006.01)
(52) U.S. Cl.
USPC ............. 106/281.1; 106/278; 524/59; 524/70
(58) Field of Classification Search
USPC ............................ 106/281.1, 278; 524/59, 70
See application file for complete search history.

(56) References Cited

U.S. PATENT DOCUMENTS

| 3,855,167 | A  | * | 12/1974 | Bowman ..................... 106/284.4 |
| 4,352,944 | A  | * | 10/1982 | Tyman et al. .................. 568/766 |
| 6,588,973 | B1 | * | 7/2003  | Omann ............................ 404/17 |
| 6,824,326 | B2 | * | 11/2004 | Raad ............................... 405/15 |
| 7,811,372 | B2 | * | 10/2010 | Nigen-Chaidron et al. .. 106/278 |
| 8,133,316 | B2 | * | 3/2012  | Poncelet et al. ............ 106/281.1 |
| 2010/0034586 | A1 | * | 2/2010 | Bailey et al. ..................... 404/75 |
| 2011/0028578 | A1 | * | 2/2011 | Glos ................................ 521/88 |

FOREIGN PATENT DOCUMENTS

| EP | 1642935 A1 | 4/2006 | |
| GB | 2066820 A * | 7/1981 | ............. C07C 51/64 |
| JP | 47-41726 B | 10/1972 | |
| WO | 2008084014 A1 | 7/2008 | |
| WO | WO 2010110651 A1 * | 9/2010 | |

OTHER PUBLICATIONS

Risfaheri et al., "Isolation of Cardinol from Cashew Nut Shell Liquid Using the Vacuum Distillation Method"; Indonesian Journal of Agriculture 2(1), 2009; pp. 11-20, no month available.*
CardoChem Industries; "Cardanol"; 2 pages; no date available.*
Derwent Abstract of EP 1642935, Apr. 2006.*
Romera et al., "Rheological aspects of the rejuvenation of aged bitumen", Rheol Acta (2006) 45: 474-478.
Kuriakose et al., "Bituminous paints from refinery sludge", Surface and Coatings Technology, vol. 145, No. 1-3, pp. 132-138, May 2001.

* cited by examiner

*Primary Examiner* — Helene Klemanski
(74) *Attorney, Agent, or Firm* — Hoffmann & Baron, LLP

(57) ABSTRACT

A method for rejuvenating a bitumen containing compositions includes adding to the bitumen containing compositions a distillation residue of cashew nut shell liquid (CNSL). The distillation residue may be obtained by distillation of cashew nut shell liquid up to a temperature of between 250 and 350° C. The bitumen containing composition may be selected from: bitumen, asphalt, roof covering, insulating material, shore covering material, and anti-drum plates.

12 Claims, No Drawings

METHOD FOR REJUVENATING A BITUMEN CONTAINING COMPOSITION

CROSS-REFERENCE TO RELATED APPLICATIONS

This application is the National Stage of International Application No. PCT/NL2010/000007, filed Jan. 21, 2010, which claims the benefit of Netherlands Application No. 2002442, filed Jan. 22, 2009, the contents of which is incorporated by reference herein.

FIELD OF THE INVENTION

The present invention relates to a method for rejuvenating a bitumen containing composition.

BACKGROUND OF THE INVENTION

In the prior art several methods are known for rejuvenating bitumen containing compositions. An example thereof is disclosed in R. Romera, Project 1992-1993/ISSN 0361-1981, Transportation Research Board of the National Academies, Spain, "Rheological Aspects of the rejuvenation of aged bitumen", Jun. 27, 2005. Herein the following rejuvenation additives have been tested: commercial aromatic oil, aromatic motor recycling oil, and Soft 150/200 Penetration Bitumen. Research showed that the best composition contained 80% aged bitumen in combination with 20% motor oil. No cashew nut shell oil is mentioned.

Also WO/2008/084014, in the name of Shell Internationale Research Maatschappij BV at the Hague (NL), discloses a rejuvenating agent and a method for recycling asphalt. As a rejuvenating agent a composition is used comprising bitumen and palm oil.

Examples of other known rejuvenating agents from the prior art are paraffins and rape seed oil etc. However these agents have just like palm oil the important disadvantage that they render the bitumen too soft, whereby the viscosity of the bitumen containing composition, such as for example asphalt, becomes also too low. In the case of for example asphalt because of these agents the adherence to the aggregate is decreasing whereby the durability of the asphalt is being impaired. Also these agents are poorly mixable with the bitumen.

Further petrochemical resins exist which can be used as rejuvenating agents for bitumen containing compositions, although these are very expensive.

In the prior art it is known to recycle asphalt and other bitumen containing compositions. Hereto the compositions usually are milled and added to new compositions to be prepared or are recycled as such while adding suitable additives. In this case always also new fresh bitumen has to be added to the composition to guarantee the processability and quality (durability, life) of the composition. In other words, compositions being comprised of solely recycled bitumen containing material with good properties for use in practice showed to be impossible up till present. Although such compositions exist these are applied where the inferior properties thereof are not important. For example machined asphalt is reused without the addition of fresh bitumen for road side reinforcement edges. Such a material is however fully unsuitable for use as new road surface.

The amount of available suitable bitumen is decreasing considerably in recent years. This is a consequence of the fact that petroleum is distilled at increasing temperatures whereby less and less heavy fraction remains. Furthermore heavy fractions are upgraded to obtain more useful and therefore more valuable products. The amount of available bitumen thereby not only decreases but also the quality is getting worse. Nowadays because of that bitumen is even prepared new from other chemical substances.

Bitumen containing compositions are very sensitive to aging and therefore have to be replaced in time as the properties in time degrade. Ageing of bitumen containing compositions can be caused by different mechanisms, comprising oxidation, evaporation of substances, UV-attack, exudation and orientation. In this process partly maltenes are converted into asphaltenes, whereby the material gets more brittle. By ageing the favorable properties for processing and application decrease in quality. The compositions frequently become harder, more brittle, less flexible and in time less and less recyclable.

Bitumen is for the majority used in asphalt for road construction. By erosion and weather influences asphalt ages relatively quick and usually asphalt has to be renewed within ten years. Hereto the asphalt is removed from the road surface and decreased in size by milling. This milling product is recycled with new asphalt preparation in a small amount. Real recycling of such milling asphalt while maintaining good asphalt properties is nowadays only possible with very high cost by for example the additional of special chemical substances or fresh bitumen.

In the prior art therefore a demand exists for a method for rejuvenating bitumen, such that old bitumen containing compositions can be recycled. Up till present this appeared not or only on a very costly manner to be possible.

SUMMARY OF THE INVENTION

The present invention intends to meet said need and thereto provides a method for rejuvenating a bitumen containing compositions, said method comprising adding a distillation residue of cashew nut shell liquid (CNSL) to the bitumen containing composition said distillation residue being obtained by distillation of cashew nut shell liquid up to a temperature of between 250 and 350° C., preferably up to a temperature of between 300 and 340° C., and most preferably up to a temperature of between 310 and 320° C.

Surprisingly it appeared that by the addition of a relatively small amount of this specific distillation residue of CNSL the bitumen in the composition is rejuvenated such that the properties thereof are improved and the bitumen is again made suitable for the usual applications thereof. In some cases the rejuvenated bitumen is even superior to freshly prepared bitumen with regard to certain properties.

The distillation residue of CNSL which has to be added is not irritating such that this can be suitably processed without disadvantageous consequences for the user. This is of particular advantage in for example road construction whereby asphalt is laid at elevated temperatures. Further CNSL is a natural product, which has huge technical advantages.

CNSL is a resin which is extracted from the shells of cashew nuts and is available in large quantities. This resin virtually completely consists of phenolic compounds with a chain length of substantially 15 C-atoms with varying unsaturation degrees, meta-substituted in the phenol ring.

Per se EP-A-1 642 935 discloses a bitumen containing binding agent used in for example road construction, for surface treatments an asphalt mixing system method. Said agent comprises a bitumen basis and a flux agent for example a reactive flux agent such as cashew nut shell liquid (CNSL), cardol or cardanol. CNSL in this respect relates to the distillation product and not to the distillation residue of cashew nut shell liquid. The distillation product is a reactive product intended to alter properties in a reactive manner. The distillation residue according to the invention is not reactive and adjusts the properties of the bitumen containing composition in a physical manner.

In the prior art CNSL substantially refers to the 'reactive' distillation product thereof and not to the 'non-reactive' green cashew nut shell liquid obtained by extracting cashew nut shells, nor the 'non-reactive' distillation residue according to the invention.

The distillation residue of CNSL used according to the invention consist mainly of a mixture of polymerization products of 3-pentadecenylphenol and 3-pentadecadienylresorcinol in the form of an alkylphenol resin which is liquid at room temperature. The chain length is approximately 13-16 carbon atoms.

The rejuvenation of bitumen is intended to mean that the properties of used bitumen are improved such that the bitumen regains properties which are better than these of the used bitumen, advantageously comparable with those of fresh bitumen, and in particular better than those of fresh bitumen.

The distillation residue advantageously has a viscosity which is comprised between 1,000 and 30,000 mPa·s$^{-1}$, preferably between 1,000 and 10,000 mPa·s$^{-1}$, more preference between 1,000 and 2,500 mPa·s$^{-1}$, and the most preferred viscosity is substantially 1,500 mPa·s$^{-1}$. A distillation residue with such a viscosity is particularly suitable for rejuvenating bitumen.

In a special embodiment of the invention the distillation residue has an average saturation factor of 1 to 5, and preferably 1.2 to 1.3.

Advantageously the bitumen containing compositions is selected from: bitumen, asphalt, insulating material, shore covering material and anti-drum plates.

The invention further provides a bitumen containing composition which has been rejuvenated by application of the method according to the invention.

Preferably the rejuvenated bitumen containing composition is selected from: asphalt, insulating material, roofing, shore covering material, anti-drum plates.

DETAILED DESCRIPTION OF THE INVENTION

In the following the invention will be explained further with the aid of a number of example methods for rejuvenating bitumen containing compositions.

EXAMPLE 1

Method for Rejuvenating Bitumen Containing Recycled Roof Shingles

The roof shingles used were roof webs which for about 20 years had laid on roofs on different locations in The Netherlands. The origin of the roof bitumen was varying as apart from renovation debris it also concerned demolition debris. This aged bitumen roofing consisted of 50% by weight of bitumen with atactic polypropylene (App) (polymer modified bitumen) and for the remainder of fillers and split material. This shingles were reduces in size mechanically.

Further a mixture range was made of the shingles with the addition of different amounts of CNSL distillation residue obtained by distilling cashew nut shell liquid up to a temperature of 315° C., (viz Table 1). Of this range samples were subjected to accelerated aging at 80° C. during one week and at 70° C. during 12 weeks. Both ageings were executed according to the standard artificial aging method as described in NEN-EN 495-5 and also in NEN-EN 129.

TABLE 1

| | | Subject (unity) APR roof bitumen | | | | | | |
|---|---|---|---|---|---|---|---|---|
| | | Value Virgin APR roof Bitumen | Value aged roof Bitumen | Value aged roof Bitumen | Value aged roof Bitumen | Value aged roof Bitumen | Value aged roof Bitumen | Value aged roof Bitumen |
| Addition CNSL Residue (EMC) | | 0 | 0 | 5 | 10 | 15 | 20 | 25 |
| Low temperature flexibility (° C.) | initially | −15 | 5 | 3 | −4 | −10 | −15 | 19 |
| | After 1 week 80° C. | −10 | 12 | 4 | −4 | −9 | −14 | −18 |
| | After 12 weeks 70° C. | −5 | 12 | 4 | −3 | −8 | −13 | −17 |
| Tensile strength (N/50 mm): | longitudinal | 850 | 600 | 620 | 750 | 800 | 820 | 770 |
| | transverse | 700 | 450 | 500 | 630 | 700 | 690 | 620 |
| Flow resistance (° C.) | initially | 140 | 200 | 195 | 160 | 145 | 135 | 120 |
| | After 12 weeks 70° C. | 140 | 200 | 200 | 170 | 150 | 140 | 130 |
| Nail tear strength (N) | | 150 | 80 | 80 | 100 | 120 | 100 | 90 |

All these bitumen containing compositions can be rejuvenated such by the addition of the specific distillation residue of CNSL according to the invention that these become suitable for recycling without the addition of fresh bitumen, although this addition of course is not excluded.

To further improve the properties of the rejuvenated bitumen containing composition even further the bitumen containing composition can additionally be made up with one of more the following substances: resin whether or not vegetable, oil whether or not vegetable, paraffins, polymers such as EVA, SBS, APP, PE metallocenes and synthetic waxes.

These tests showed that the ageing process with the CNSL went slower relative to the shingle based on new bitumen (production 2008).

After this test range test pieces of the samples with 10% up to and including 25% CNSL addition were applied on a roof in Heerhugowaard (NL). During processing the shingles with 10% and 15% CNSL addition to the recycled aged roof bitumen showed less good processing properties. The shingles were at an outside temperature of 12° C. too rigid during processing. The shingles with an addition of 20% showed the best processing properties. This composition resembles most that of a shingle based on new bitumen (production 2008).

EXAMPLE 2

Method for Rejuvenating a Bitumen Containing Recycled Milled Asphalt Composition For the asphalt tests rheologic tests were performed by measuring the viscosity of mixtures of aged road construction bitumen and aged roof bitumen at different temperatures while mixing in different percentages of CNSL residue, obtained by distilling cashew nut shell liquid to up to a temperature of 315° C. Viz Table 2 for the results.

TABLE 2

| Number | Aged roof Bitumen | Aged road construction Bitumen | CNSL residue EMC | Viscosity at 100° C. | Viscosity at 120° C. | Viscosity at 140°c | Viscosity at 160° C. | Viscosity at 180° C. | Viscosity at 200° C. |
|---|---|---|---|---|---|---|---|---|---|
| 1 | 20 | 75 | 5 | 40,000 | 7,000 | 1,450 | 650 | 250 | 100 |
| 2 | 40 | 50 | 10 | 49,000 | 7,800 | 1,850 | 750 | 350 | 105 |
| 3 | 60 | 25 | 15 | 57,000 | 8,700 | 2,900 | 850 | 450 | 110 |
| 4 | 80 | 0 | 20 | 74,000 | 11,000 | 5,300 | 11,00 | 675 | 380 |
| 5 | 100 | 0 | 0 | solid | solid | solid | 8,000 | 6,300 | 4,850 |
| 70/100 | | | | 4800 | 1,000 | 600 | 300 | 100 | 80 |

In the rheology tests the roof bitumen and the CNSL were used in a fixed proportion. The proportion was 4 parts of roof bitumen: 1 part CNSL residue (on a weight basis). The origin of the roof bitumen was the same as the tests described earlier. The aged road construction bitumen originated from milling different asphalt roads. This milled asphalt was heated in a heating drum and mixed with the roof granulate. De roof granulate was first premixed with the CNSL residue and cold added to the preheated minerals and the milled asphalt in the asphalt mixer. This mixture was mixed homogeneously and additionally tested, as shown in Table 3.

TABLE 3

Closed asphalt concrete 0/16 with 50%-machined asphalt

| Composition | Serie 1 40/60 and milled % | Serie 2 Roof granulate and milled % | Serie 3 Roof granulate and milled % |
|---|---|---|---|
| 11/16 | 21.81 | 21.81 | 21.81 |
| 8/11 | 9.54 | 7.05 | 9.54 |
| Sand | 12.76 | 8.57 | 12.76 |
| Filler (chalk) | 3.01 | | 3.01 |
| Milled material | 49.90 | 49.90 | 49.90 |
| Roofing granulate | | 12.11 | |
| Roof granulate bitumen | | | 2.42 |
| Bitumen 40/60 | 3.01 | | |
| CNSL Residue | | 0.59 | 0.59 |
| Total | 100.0 | 100.0 | 100.0 |

| | Series 1 | Series 2 | Series 3 |
|---|---|---|---|
| Marshall stability | 7,370 | 8,320 | 7,710 |
| Marshall Quotient | 1,391 | 1,631 | 1,402 |
| Marshall Flow | 5.3 | 5.1 | 5.5 |
| ITS 2 degrees | 415 | 290 | kPa |
| ITS 22 degrees | 204 | 102 | kPa |
| ITS 60 degrees | 14 | 13 | kPa |
| Ind. 20 degrees/3 h | 1.60 | 2.67 | mm |

Of mixture 2 a test area of asphalt was applied in a business area in Breda in June 2008 with a width of 3 m and a length of 25 m. The processing was performed in the usual manner with a standard asphalt application machine and the asphalt was densified in the usual manner with a steel roller. The processing of this asphalt mixture was identical to a normal DAB 0/16. Also the properties of the asphalt fell within the production parameters for DAB 0/16 (viz table above).

Explanation of the Raw Materials

Roof granulate: This was a mixture of different bituminous roofings derived from demolition labor and roofing companies in replacing old bituminous roofs. This demolition debris was mild and homogeneoused. This substantially consisted of bitumen being APP modified with minerals and glass fiber reinforcement. During milling a granulate was obtained which could vary in size from 0.5 mm to 15 mm.

Milled asphalt: This was asphalt granulate obtained by milling aged or damaged asphalt road. Milling was performed selectively such that different qualities were kept separate in for example DAB, STAB, ZOAB and the like. After milling the granulate was classified by sieving.

CNSL residue: This was a residue product of the raw cashew nut shell liquid distillation taking place up to 315° C.

All main components of the DAB 0/16 were products derived from residual streams, and by mixing in the described proportions an asphalt composition was made corresponding to asphalt based on new raw materials.

The invention claimed is:

1. A method for rejuvenating a bitumen containing compositions, said method comprising adding to the bitumen containing compositions a distillation residue of cashew nut shell liquid (CNSL), said distillation residue being obtained by distillation of cashew nut shell liquid up to a temperature of between 250 and 350° C.

2. The method according to claim 1, wherein the distillation residue has a viscosity which is comprised between 1,000 and 30,000 mPa·s⁻.

3. The method according to claim 1, wherein the distillation residue has an average saturation factor of 1 to 5.

4. The method according to claim 1, wherein the bitumen containing composition is selected from the group consisting of bitumen, asphalt, roof covering, insulating material, shore covering material, and anti-drum plates.

5. The method according to claim 1, wherein the bitumen containing compositions is in addition made up with one of more of the following substances selected from the group consisting of resin, vegetable resin, oil, vegetable oil, paraffins, polymers and synthetic waxes.

6. A bitumen containing composition which has been rejuvenated by application of a method according to claim 1.

7. The bitumen containing composition according to claim 6, wherein the rejuvenated bitumen containing compositions is selected from the group consisting of asphalt, insulating material, roofing material, shore covering material and anti-drum plates.

8. The method according to claim 1, wherein the distillation residue has a viscosity which is comprised between 1,000 and 10,000 mPa·s$^{-1}$.

9. The method according to claim 1, wherein the distillation residue has a viscosity which is comprised between 1,000 and 2,500 mPa·s$^{-1}$.

10. The method according to claim 1, wherein the distillation residue has a viscosity which is substantially 1,500 mPa·s$^{-1}$.

11. The method according to claim 1, wherein the distillation residue has an average saturation factor of 1.2 to 1.3.

12. The method according to claim 5, wherein the polymers are selected from the group consisting of EVA, SBS, APP, PE and metallocenes.

* * * * *